P. C. DAY.
TRANSMISSION GEARING.
APPLICATION FILED DEC. 13, 1918.
1,343,963.
Patented June 22, 1920.
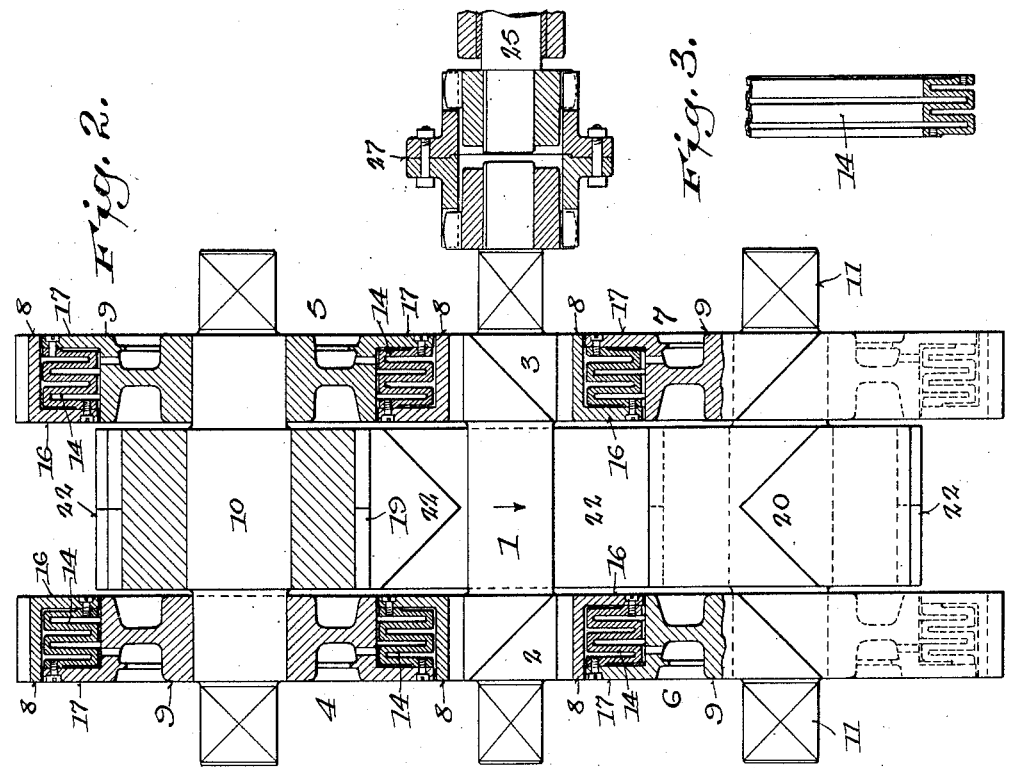
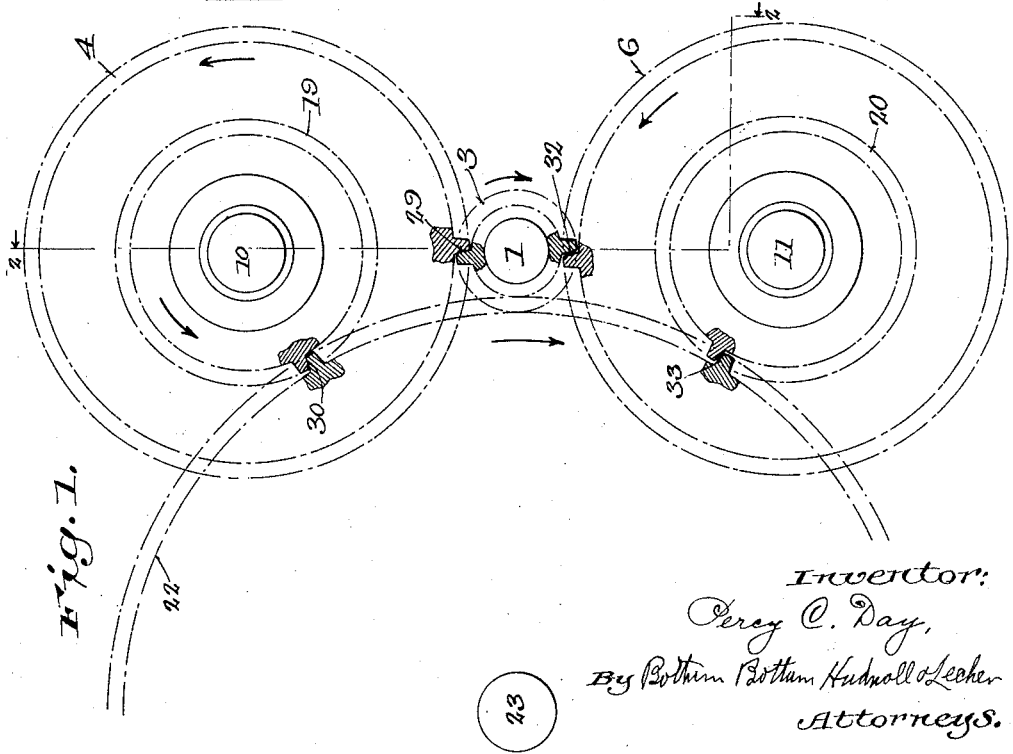
Inventor:
Percy C. Day,
By Bothum Bottum Hudnell & Lecher
Attorneys.

UNITED STATES PATENT OFFICE.

PERCY C. DAY, OF MILWAUKEE, WISCONSIN, ASSIGNOR TO THE FALK COMPANY, OF WAUWATOSA, WISCONSIN, A CORPORATION OF WISCONSIN.

TRANSMISSION-GEARING.

1,343,963.  Specification of Letters Patent.  Patented June 22, 1920.

Application filed December 13, 1918. Serial No. 266,525.

*To all whom it may concern:*

Be it known that I, PERCY C. DAY, a subject of the Kingdom of Great Britain, residing at Milwaukee, in the county of Milwaukee and State of Wisconsin, have invented certain new and useful Improvements in Transmission-Gearing, of which the following is a specification, reference being had to the accompanying drawing, forming a part thereof.

This invention relates more particularly to double reduction gearing of the type in which power is transmitted from a single first motion pinion or gear to two first motion gears which are connected through their shafts to two second motion pinions or gears which, in turn, transmit the power derived from the single first motion pinion or gear to a single second motion gear; such for example, as double reduction double helical gearing as applied to the propulsion of ships deriving power from high speed steam turbines.

The main objects of the invention are to insure a fair division of load and tooth pressure between the two paths of transmission from the first motion or driving pinion or gear to the final driven gear; to reduce the requisite width of the face of the gears; to reduce the size and weight of the driven gear under given conditions of speed and load; to effect a great reduction or change in speed in the transmission of heavy loads by simple, compact and efficient mechanism; and generally to improve the construction and operation of this class of gearing.

The invention consists in the construction, arrangement and combination of parts as hereinafter particularly described and pointed out in the claims.

In the accompanying drawing like characters designate the same parts in the several figures.

Figure 1 is a diagrammatic end view as seen from the left relative to Fig. 2, of double reduction gearing embodying the invention, showing sections of teeth at engaging points in the gears, exaggerated for clearness; Fig. 2 is a side elevation and longitudinal section of the gearing on the line 2—2, Fig. 1; and Fig. 3 is a sectional detail of a resilient yielding member used in some of the intermediate gears.

Referring to the drawing, 1 designates the driving pinion or gear and its shaft, comprising two sections or parts 2 and 3, spaced from one another in the present instance and formed respectively with right hand and left hand helical teeth.

The sections or parts 2 and 3 of the driving pinion or gear 1, mesh with four correspondingly toothed intermediate gears 4, 5, 6 and 7. These intermediate gears comprise helically toothed rings or rims 8, mounted and shiftable axially on spiders or hub sections 9, which are rigidly mounted on intermediate shafts 10 and 11, parallel with the driving shaft 1. The helical teeth of the coaxial gears 4 and 5 and of the coaxial gears 6 and 7 are of opposite hand, while the teeth of the opposite gears 4 and 6 and of the opposite gears 5 and 7 are of the same hand.

The toothed rings or rims 8 are connected with the spiders or hub sections 9 by resilient yielding members 14, which are so constructed and attached to the rims and hub sections as to form rigid connections between them with respect to radial and circumferential forces, but to yield with elastic resistance to forces acting parallel with the axes of the intermediate shafts 10 and 11.

As shown in Figs. 2 and 3, the resilient yielding members 14, which are of annular or ring form, may be conveniently made from cylinders of steel or other suitable spring metal, grooved radially and circumferentially or perpendicular to their axes alternately from the inside and from the outside and bolted on one side to inwardly projecting flanges 16 on the rings or rims 8 and on the other side to outwardly projecting flanges 17 on the spiders or hub sections 9.

The axes of the intermediate shafts 10 and 11 are usually arranged in the same plane with the axis of the driving shaft and pinion or gear 1, but this is not necessary, as they may be arranged in different planes so that the intermediate gears 4, 5 6 and 7 will mesh at different points with the driving pinion or gear 1.

Second motion double helical intermediate pinions or gears 19 and 20, are rigidly mounted on the shafts 10 and 11 respectively. They may be conveniently located as shown in Fig. 2, between the coaxial first motion intermediate gears 4 and 5 and the corresponding coaxial gears 6 and 7.

The second motion pinions or gears 19 and 20 mesh with a second motion double helical gear 22, which is mounted on a shaft 23, parallel with the shafts 1, 10 and 11.

The several shafts of the transmission gearing are supported in suitable bearings not shown, but indicated by crossed diagonal lines in Fig. 2.

The driving pinion or gear shaft 1, is connected with the shaft 25 of a steam turbine or other prime mover, as shown in Fig. 2, by an extensible or axial slip coupling 27, which permits of a free axial shifting or movement of the shaft 1 relative to the power or actuating shaft 25 with which it is connected.

The terminal driving and driven gears are thus connected by two trains of intermediate gears, each comprising three coaxial gears 4, 19 and 5, and 6, 20 and 7. The number of intermediate trains may be increased, if desired, two at least being necessary to attain the objects of the invention.

Referring to Fig. 1, a tooth is shown on one side of the driving pinion or gear 1, engaging a tooth on the ring or rim of the gear 4 at 29. At the same time, a tooth of the second motion pinion or gear 19, engages with a tooth on the terminal driven gear 22, at 30. Similar engagements should take place on the other side of the pinion or gear 1, with the gear 6 at 32, and between the pinion 20 and the gear 22 at 33.

If it were possible to construct and to adjust and maintain all the gear teeth and all the bearings with perfect mathematical precision relative to one another, the teeth at 29 and 30 and also the teeth at 32 and 33, would all be in driving contact and the load transmitted from the pinion or gear 1 would be equally divided between the gears 4 and 5 and the gears 6 and 7, which would transmit equal loads through the pinions or gears 19 and 20 to the terminal driven gear 22.

It is obvious that under such circumstances, no load equalizing device would be necessary. In practice however, minute imperfections and differences in construction and adjustment are unavoidable, and since all the gears in a transmission of this kind as usually constructed, are substantially rigid, it follows that when the teeth are in driving contact or engagement at 29 and 30, they may not be in driving contact or engagement at one or both of the points designated 32 and 33. The total gap between the teeth at the points 32 and 33 may be only a very few thousandths of an inch, and yet it is obvious that if there is not driving contact or engagement between the teeth at both of these points, all the load will be transmitted from the driving pinion or gear 1 through the intermediate gears 4, 5 and 19 to the driven gear 22, while the other train of intermediate gears 6, 7 and 20, will rotate idly without carrying any part of the load.

At 32 and 33, Fig. 1, the tooth sections are shown with spaces or gaps between their driving faces. These sections might apply to straight spur teeth, but the same principles govern the action of double helical teeth, because the pinion or gear shaft 1 is connected with the driving shaft 25 by the extensible coupling 27, which allows the pinion or gear shaft to shift freely in the direction of its axis until contact is established, as shown at 29, between both the right hand and the left hand helical teeth of the pinion or gear sections 2 and 3.

It is only when double helical teeth are employed, however, that the particular resilient yielding compensating devices 14 become effective.

Since the teeth of the pinion or gear sections 2 and 3, and of the gears 4 and 5, are helices of opposite hand, it follows that any pressure exerted by the teeth of the pinion or gear sections 2 and 3 on the teeth of the gears 4 and 5, will have axial as well as circumferential or tangential components, so that the transmission of pressure between these teeth will cause axial pressure against the elastic or resilient yielding members 14, which will cause these members to yield and allow the toothed rims 8 of the gears 4 and 5 to move in axial directions of opposite sense. This movement will be proportional to the pressure applied between the teeth, since it is assumed that the members 14 are so constructed as to oppose uniform elastic resistance to the axial movement of the gear rims within the required limits. The amount of axial pressure exerted with a given circumferential or tangential pressure is a fixed function of the spiral angle of the helical teeth. The teeth of the pinion or gear sections 2 and 3 and of the intermediate gears 4 and 5 may be formed with a spiral angle of 45 degrees, which will produce axial pressures equal to the circumferential or tangential pressures. It is to be understood however, that the teeth may be formed to any other convenient or suitable spiral angle without affecting the principle of the invention.

Referring to Fig. 1 showing the gear teeth at 29 and 30 in driving contact, and the teeth at 32 and 33 out of contact, the entire load will be transmitted from the driving pinion or gear 1 to the terminal driven gear 22 through the intermediate gears 4, 5 and 19, while the condition indicated exists, but the transmission of the load and tooth pressure from the driving pinion or gear sections 2 and 3 to the intermediate gears 4 and 5, will compress the resilient yielding members 14 and cause corresponding lateral or axial movement of the toothed rims 8 of the gears 4 and 5. This lateral or axial movement of the gear rims 8 will retard the rotary or circumferential movement of the shaft 10 and pinion or gear 19, and bring the teeth of the pinion or gear sections 2 and 3 into engagement at 32 and 33 with the teeth of the gears 6 and 7, since prior to such engagement no pressure can be exerted between the teeth of the pinion or gear sections 2 and 3 and the gears 6 and 7 and consequently there will be no lateral or axial displacement of the rims 8 of the gears 6 and 7.

A definite small portion of the total load transmitted from the driving shaft 25 or driving pinion 1 to the main or terminal driven gear 22 through the intermediate gears 4, 5 and 19, will produce sufficient axial movement of the rims 8 of the gears 4 and 5 and retardation of the rotary or circumferential movement of the gear 19, to bring the teeth of the pinion sections 2 and 3 into driving engagement with the teeth of the gears 6 and 7 at 32, and the teeth of the pinion 20 into driving engagement with the teeth of gear 22 at 33. The remainder of the load transmitted from the shaft 25 to the gear 22, will be divided or distributed with substantial equality between the intermediate gears 4 and 5 on one side, and the intermediate gears 6 and 7 on the other side, assuming that the yielding members 14 are constructed to oppose equal elastic resistance.

For example: assuming that when driving contact is first established between the gear teeth at 29 and 30, the total gap or space between the gear teeth at 32 and 33 amounts to five one thousandths of an inch; assuming that the resilient yielding members 14 are so constructed that the full load of 100 per cent. transmitted from the driving shaft 25 through either train of intermediate gears alone will cause axial movement of the gear rims 8 subjected to the load amounting to one hunded one thousandths of an inch in each direction, such movement being at all times proportional to the load; and supposing the spiral angle of the gear teeth to be 45 degrees, so that lateral or axial and circumferential or tangential displacements will be equal, then in order to close a total gap or space of five one thousandths of an inch at 32 and 33, the rims 8 of the intermediate gears 4 and 5 must be displaced axially in opposite directions five one thousandths of an inch, corresponding with one twentieth of the full load to be transmitted, which would produce one hundred one thousandths of an inch of axial movement of the gear rims.

Hence the gears 4, 5 and 19 will receive and transmit five per cent. of the total load before the gears 6, 7 and 20 begin to transmit any load.

The remaining 95 per cent. of the load will be equally divided between the two sets or trains of intermediate gears, 47½ per cent. being carried by each set or train.

Thus the total effect of the initial gaps or spaces between the gear teeth at 32 and 33 is that 52½ per cent. of the total load transmitted from the shaft 25 to the gear 22, is carried by the intermediate gears 4, 5 and 19, while 47½ per cent. of the load is carried by the other train of intermediate gears 6, 7 and 20, whereas if all the gears were rigidly mounted, 100 per cent of the load would be carried by the gears 4, 5 and 19, and no load by the gears 6, 7 and 20, under the same conditions. Gears of this kind are very accurately made and mounted, so that the gaps or spaces indicated at 32 and 33 are small, and the lateral or axial displacement of the rims 8 of the gears 4, 5, 6 and 7 necessary to insure approximately equal division of the load, is small relative to the diameter of the gears.

Since the lateral or axial forces exerted on the rims 8 of the gears 4, 5, 6 and 7 act at any given time only on a portion of the circumference of the gear rim, the tendency is to tilt these rims slightly to one side rather than to cause axial displacement of the whole rims, but this movement is so slight relative to the diameter of the gears that it does not interfere with the proper action of the gear teeth. Moreover, the intermediate gears in a transmission of this kind revolve on an average of from eight to ten times per second, and the movement of lateral or axial displacement and recovery will be relatively slow, so that in practice the entire rims will be displaced in an axial direction.

To retard the lateral movement of the gear rims 8 and prevent or reduce the tilting action thereof as above mentioned, the grooves or spaces between the several sections of the elastic or resilient members 14 may be kept filled by centrifugal action with oil supplied from the force-feed lubricating system with which gear units of this class are commonly provided.

Various modifications other than those illustrated and specifically mentioned in the construction and arrangement of parts of the gearing may be made, without departure from the principle and scope of the invention as defined in the following claims.

I claim:

1. In transmission gearing the combination of a driving gear, a driven gear and two trains of intermediate gears meshing respectively with the driving and driven gears, one gear of each train comprising a hub section, a helically toothed rim axially movable on the hub section and meshing with the driving gear, and a resilient axially yielding member between the hub section and rim.

2. In transmission gearing the combination of a double helical driving gear, a driven gear and two trains of intermediate gears connecting the driving and driven gears, two intermediate gears of each train having helical teeth of opposite hand meshing with the corresponding teeth of the double driving gear, and each of said two intermediate gears comprising a hub section, a toothed rim mounted on and axially movable relative to its hub section on which it is held against radial and circumferential displacement, and a resilient axially yielding member interposed between the hub section and rim.

3. In transmission gearing the combination of an axially shiftable double helical driving gear, a driven gear, two trains of intermediate gears, each train comprising three coaxial gears one of which meshes with the driven gear and the other two have helically toothed axially shiftable rims of opposite hand meshing with correspondingly toothed portions of the driving gear, hub sections on which the toothed rims are movably mounted, and resilient axially yielding members between the hub sections and rims adapted to approximately equalize the load between both trains of intermediate gears.

4. In transmission gearing the combination of an axially shiftable double helical driving gear, a driven gear, and two trains of intermediate gears connecting the driving and driven gears and each comprising two coaxial gears having rigidly connected hub sections; independently and axially shiftable helically toothed rims of opposite hand mounted on said hub sections and meshing with correspondingly toothed portions of the driving gear; and resilient axially yielding members interposed between the hub sections and rims and consisting of rings radially and circumferentially grooved alternately from the inside and outside.

5. In transmission gearing the combination of terminal driving and driven gears one of which has helical teeth of opposite hand, a number of trains of intermediate gears connecting the terminal gears and each comprising three coaxial gears, one meshing with one of the terminal gears and located between the other two intermediate gears which have hub sections, rims mounted and axially shiftable on the hub sections and having helical teeth of opposite hand meshing respectively with the correspondingly toothed portions of the other terminal gear, and resilient axially yielding members interposed between the hub sections and rims.

6. In transmission gearing the combination of terminal, driving an driven gears, one of which has helical teeth of opposite hand, and two trains of intermediate gears connecting the terminal gears, each comprising three coaxial gears, one meshing with one of the terminal gears and located between the other two intermediate gears which have hub sections, rims movably mounted on the hub sections and formed with helical teeth of opposite hand meshing respectively with the correspondingly toothed portions of the other terminal gear, and resilient axially yielding rings, interposed between the hub sections and rims and circumferentially and radially grooved alternately from the inside and from the outside.

In witness whereof I hereto affix my signature.

PERCY C. DAY.